(12) United States Patent
Deppe et al.

(10) Patent No.: US 8,022,644 B2
(45) Date of Patent: Sep. 20, 2011

(54) GAS DISCHARGE LAMP IGNITION

(75) Inventors: Carsten Deppe, Aachen (DE); Peter Luerkens, Aachen (DE); Raul Duran, Barcelona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 672 days.

(21) Appl. No.: 11/994,426

(22) PCT Filed: Jul. 3, 2006

(86) PCT No.: PCT/IB2006/052231
§ 371 (c)(1),
(2), (4) Date: Jan. 2, 2008

(87) PCT Pub. No.: WO2007/004191
PCT Pub. Date: Jan. 11, 2007

(65) Prior Publication Data
US 2008/0309249 A1    Dec. 18, 2008

(30) Foreign Application Priority Data
Jul. 6, 2005   (EP) ..................................... 05106136

(51) Int. Cl.
*H05B 41/00* (2006.01)
(52) U.S. Cl. ........................................ 315/326; 315/330
(58) Field of Classification Search .................. 315/326, 315/330, 349, 352
See application file for complete search history.

(56) References Cited

U.S. PATENT DOCUMENTS

| 4,379,982 | A | 4/1983 | Proud |
| 4,491,766 | A | 1/1985 | Larson |
| 5,030,894 | A * | 7/1991 | Yoshiike et al. .............. 315/335 |
| 6,380,679 | B1 | 4/2002 | Leers et al. |
| 6,563,267 | B1 | 5/2003 | Van Den Nieuwenhuizen et al. |
| 6,734,643 | B2 | 5/2004 | Okamoto et al. |
| 2003/0173912 | A1 | 9/2003 | Huber et al. |
| 2005/0062429 | A1* | 3/2005 | Imoto ............................ 315/94 |

FOREIGN PATENT DOCUMENTS

| EP | 1272012 A1 | 1/2003 |
| EP | 1345478 A2 | 9/2003 |
| EP | 1653785 | 5/2006 |
| JP | 2001338789 | 12/2001 |
| WO | 0077826 | 12/2000 |

* cited by examiner

*Primary Examiner* — Douglas W Owens
*Assistant Examiner* — Jianzi Chen

(57) ABSTRACT

Ignition of a gas discharge lamp 10, which has a gas containing main space and two inner electrodes, of a lighting unit 4 of a lighting system is achieved by the use of a high frequency resonance circuit. The resonance circuit is connected to the inner electrodes and to a supply device 2, which supplies an alternating supply voltage. An outer electrode 22 is arranged near one the inner electrodes and to a node of the resonance circuit. Upon supplying the supply voltage a high voltage alternating burst will be generated at the outer electrode. This will result into a discharge of the gas in the main space. In turn, this will induce a discharge of the remaining gas. Then the frequency of the supply voltage will increase and a small reactive current only will remain to flow through the resonance circuit.

5 Claims, 1 Drawing Sheet

GAS DISCHARGE LAMP IGNITION

FIELD OF THE INVENTION

The invention relates to igniting a gas discharge.

BACKGROUND OF THE INVENTION

U.S. Pat. No. 6,734,643 discloses a lighting system comprising a feed circuit part, a lamp unit which contains a gas discharge lamp and a starter circuit. The starter circuit is divided in a starter drive part, which is contained in the feed circuit part, and a high voltage generating part, which is contained in the lamp unit. The feed circuit part further comprises a feed circuit for supplying an alternating supply voltage to the lamp unit, and a starter drive part. The lamp unit comprises a lamp and a high voltage generating part. Inner electrodes of the lamp are connected via two terminals of the lamp unit and via two terminals of the feed circuit part to the supply source. An outer auxiliary electrode of the lamp and an inner electrode of the lamp are connected to the high voltage generating part of the lamp unit. The high voltage generating part is connected via two terminals of the lamp unit, of which one terminal connected also to an inner electrode, via terminals of the feed circuit part to the starter drive part of the feed circuit part. The starter drive part is supplied by the alternating supply voltage. The starter drive part comprises an electronic switch and a capacitor to alternately charge and discharge said capacitor by which a transformer of the high voltage generating part induces a sequence of high voltage pulses, which are supplied to the outer electrode of the lamp. Said pulses may discharge a portion of gas contained in the lamp between said outer electrode and one of the inner electrodes. This may cause a discharge of between the inner electrodes, that is to ignition of the lamp. As a result the alternating supply voltage supplied to the lamp will decrease. As a result the electronic switch of the starter drive part will fail to conduct anymore, so that the supply of high voltage pulses to the outer electrode of the lamp terminates. The electronic switch may comprise a thyristor or a SIDAC, which means that the starter circuit, and as a consequence the disclosed system as a whole, operates at a relatively low frequency. A frequency of less than 500 kHz is considered low in this description.

A disadvantage of said prior art is that it requires quite some hardware to provide the starter circuit, such as a high voltage transformer and an electronic switch. Another disadvantage of said prior art is that it requires three conductors to connect the feed circuit part to the lamp unit, of which one conductor is used during less of a second for igniting the lamp only. As a result a dedicated, expensive cable is required to connect the feed circuit part to the lamp unit. A further disadvantage of the prior art is that a supply voltage for the lamp having a high frequency, for example above 2 MHz will be too expensive to be used in many cases. If the hardware of the starter circuit would be made suitable to operate with such a high frequency it would require an even more dedicated high frequency cable containing three conductors.

A gas discharge lamp of the above type may comprise start-promoting means as shown in U.S. Pat. No. 6,734,643 and as described in more detail in U.S. Pat. No. 6,563,267. Accordingly, for each electrode, the lamp may comprise a seal incorporating an electric conductor in the form of a foil which connects the electrode inside the main space or vessel of the lamp to a metal wire, which projects to the exterior from the seal. The seal has a cavity, which contains a gaseous constituent, for example mercury vapor. The cavity constitutes the start-promoting means as a source of UV radiation when applying an electric voltage across the cavity. The UV radiation source is referred to as UV enhancer.

OBJECT OF THE INVENTION

It is an object of the invention to solve the drawbacks of the prior art as described above.

SUMMARY OF THE INVENTION

By doing so ignition of a gas discharged lamp is simplified. The resonance circuit will stop working automatically upon discharging of the gas between the inner electrodes of the lamp. Therefore, after ignition, the resonance circuit will not consume and dissipate a significant amount of energy. As a consequence, only a fraction of a second for the ignition is to be taken into account for determining the dimensions of parts of the resonance circuit to handle said energy. As a result, the resonance circuit can be made small and cheap and it can be arranged close to the lamp, possibly to form an integral lighting unit together with the lamp. Only two conductors are required to ignite and to supply such lighting unit. Using a coaxial cable between the supply device and the lighting unit provides a relatively simple and cheap connection means, which provides excellent shielding against electromagnetic interference (EMI) in addition.

U.S. Pat. No. 6,563,267, mentioned above, discloses the use of an external electrode or antenna, which is arranged at the outside of a seal across the cavity of said seal. The external electrode is connected to the electrode extending through the other seal only. The external electrode reduces a possible ignition delay upon re-ignition of the lamp directly after it has been extinguished, which effect is referred to as hot restrike.

BRIEF DESCRIPTION OF THE DRAWINGS

The invention will become more gradually apparent from the following exemplary description in connection with the accompanying drawing. In the drawing.

DETAILED DESCRIPTION OF EXAMPLES

Figure 1:
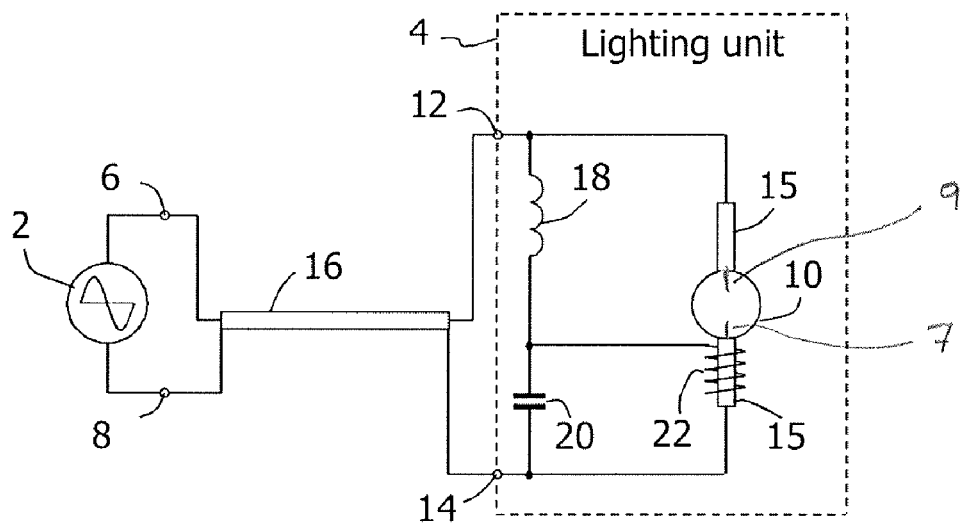
FIG. 1 shows a diagram of a first embodiment of a lighting system in which the invention is applied.

The diagram of FIG. 1 shows a first embodiment of a lighting system in which the invention is applied. The system comprises, as main components, a supply device 2 and a lighting unit 4. The supply device 2 supplies an alternating voltage to its terminals 6, 8. The lighting unit 4 comprises a gas discharge lamp 10, which has a space or vessel, which contains a gas, first inner electrode 7 and second inner electrode 9, which are connected to terminals 12 and 14 of the lighting unit 4.

On opposite sides the lamp 10 it may have an elongated seal portion 15 which has a cavity containing a gaseous constituent, such as mercury vapor. A foil of, for example, molybdenum, extends along the length of the cavity. An arrangement comprising such seal 15 is called an UV enhancer. The use of an UV enhancer is disclosed by U.S. Pat. No. 6,563,267. An UV enhancer constitutes a start-promoting means as a source of UV radiation when applying an electric voltage across the cavities.

It must be noted that the invention is not limited to be applied with a gas discharge lamp provided with an UV enhancer. Therefore, an inner electrode (e.g., first inner electrode 7, second inner electrode 9) is considered to extend from the interior of the main space or vessel of the lamp to the outside of the lamp, whether or not an UV enhancer is used.

The supply device 2 is connected to the terminals 12 and 14 of the lighting unit 4 by two conductors. In particular said conductors are provided by a coaxial cable 16.

The lighting unit 4 further comprises a series circuit of an inductor 18 (in general an inductive element) and a capacitor 20 (in general a capacitive element). The series circuit is connected to the terminals 12 and 14 of the lighting unit 4. A connection node of the inductor 18 and the capacitor 20 is connected to an auxiliary outer electrode 22, which is arranged outside the lamp 10 in the proximity of a first inner electrode 7 of the lamp 10. As a consequence, the first inner electrode 7 and the outer electrode 22 form a capacitive element. Such an outer electrode 22 may be called antenna also.

The lamp 10, the inductor 18, capacitor 20 and, together, the outer electrode 22 and the first inner electrode 7 form a resonance circuit. Upon applying an alternating supply voltage with a frequency close to the resonance of the series resonant circuit to the lighting unit 4 the resonance circuit will generate a high voltage at the outer electrode, by which an electric field of high intensity is generated between the first electrode and the outer electrode. When generating an electric field of appropriate magnitude a portion of the gas in the proximity of these electrodes will discharge, which in turn will induce a discharge of the gas in the (main) space of the lamp 10.

In particular the lamp 10 is a high intensity discharge (HID) lamp, possibly an ultra high pressure (UHP) HID-lamp. To reduce costs for drivers, such as contained in supply device 2, the operating frequency as supplied by supply device 2 has increased over time and is expected to further increase. At present, normal operating frequencies are within a range of 50 kHz to 100 MHz for HID-lamps in general and within a range of 2 MHz to 50 MHz for UHP-lamps in particular. During normal operation, that is after ignition of the lamp 10, a peak voltage between the inner electrodes 7,9 can be a few hundreds volt only to sustain the discharge of the gas. However, ignition requires a much higher voltage, which is in a range of 2.5 kV to 25 kV. According to the prior art ignition transformers are required to supply high voltage ignition pulses. Instead, according to the invention a simple resonance circuit as described above is used to generate high voltage ignition pulses.

To get an impression about the dimensions of components which are required to bring the invention to practice the following example is given.

Suppose that before ignition of the lamp the supply voltage has a peak value of 400V and that its frequency is 10 MHz. Further suppose that capacitor 20 has a value of 20 pF. As a result capacitor 20 has an impedance of 796Ω at this frequency. Further assuming (allowing) a current having a peak value of 3.18 A (2.52 $A_{rms}$), then a peak voltage of 2530V is generated across capacitor 20 and therewith at the outer electrode 22. As a consequence a voltage across inductor 18 of 400+2530=2930V must be generated for having said current flow. Accordingly, inductor 18 should have an impedance of 922Ω, so that inductor 18 must have a value of 14.7 µH at said frequency of 10 MHz. With these values of inductor 18 and capacitor 20 the resonance frequency will be 9.39 MHz.

Upon ignition of the lamp 10, the impedance of the lamp 10 will decrease. At the same time the operating frequency of the supply voltage will increase to 13.56 MHz and the supply voltage will decrease to about 100V. The impedance of the resonance circuit will increase to about 665Ω. As a result a reactive current of 150 mA only will flow in the resonance circuit. As a result of that, apart from their small electrical values, the components of the resonance circuit may have small physical dimensions. Therefore the resonance circuit may easily be installed in the proximity of the lamp 10 to therewith form an integral lighting unit 4.

Preferably the value of 20 pF of capacitor 20 is reduced and a lower frequency during ignition is used, so that the current required for ignition and the reactive current through the resonance circuit are reduced further. Reducing the value of capacitor 20 will be limited by the increasing size of inductor 18 and increasing sensitivity for stray components. Taking these considerations in account and preferably, capacitor 20 may be omitted under circumstances and the capacity provided by the outer electrode 22 and the first inner electrode 7 in its proximity can be used only for generating a high voltage ignition pulse in accordance with the invention.

Since there are only two conductors required to connect the supply device 2 to the lighting unit 4 a connection cable can be simple and cheap. In addition it allows for a simple and cheap EMI protection by using a coaxial cable as indicated by cable 16 in FIG. 1.

Figure 2:
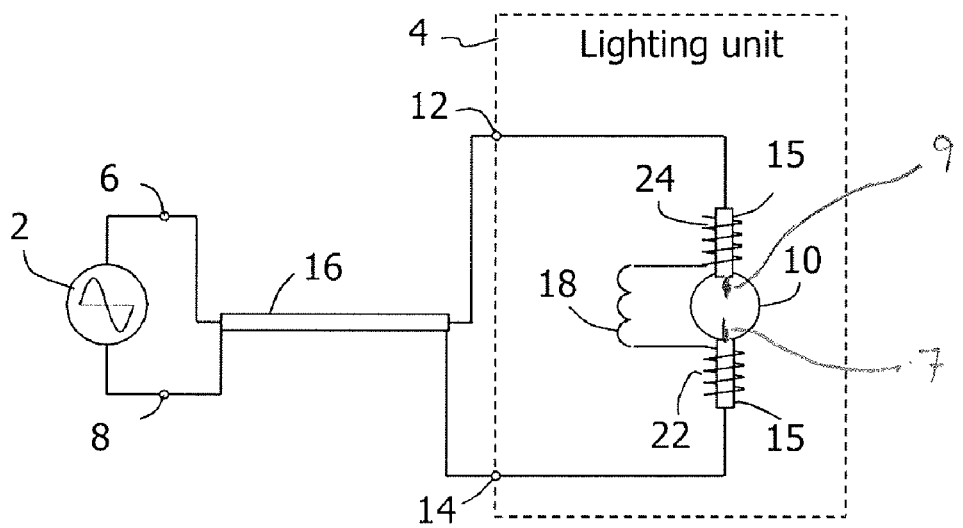
FIG. 2 shows a diagram of a second embodiment of a lighting system in which the invention is applied.

FIG. 2 shows a diagram of a second embodiment of a lighting system in which the invention is applied. The diagram differs from that shown in FIG. 1 by (I) no external capacitor is used, the resonance is designed with the intrinsic capacity between antenna 22 and lamp connections/electrodes, (II) the connection of inductance 18 to terminal 12 is replaced by another capacitor comprised of a second outer electrode 24, which is arranged nearer to the second inner electrode 9 than the first inner electrode 7 near the first electrode 22 of FIG. 1. Just like the first outer electrode 22, the second outer electrode provides a capacity together with its near inner electrode. By connecting the inductor 18 between the two outer electrodes a similar effect during start up of the system as with the system of FIG. 1 is obtained. High electric fields (voltage) are provided on both sides of the lamp. The arrangement of FIG. 2 with two outer electrodes may be more cost effective. Depending on requirements given from lamp and manufacturing processes, various mixed solutions based on FIGS. 1 and 2 can be derived by the skilled expert. For example also in FIG. 2 on one or both sides additional external capacitors can be added.

The invention claimed is:

1. A method for igniting a gas discharge lamp, which has a gas discharge space containing a gas and two inner electrodes at a distance from each other, the method comprising:
   providing an outer electrode at the outside of the gas discharge space in a proximity of a first electrode of the inner electrodes;
   applying an alternating supply voltage having a supply voltage frequency to the inner electrodes;

while the gas between the inner electrodes is not discharged, applying an ignition voltage to the outer electrode;

whereby the ignition voltage is suitable to discharge said gas between the first inner electrode and the outer electrode, and generating the ignition voltage with a resonance circuit, wherein a resonance frequency of the resonance circuit is made such that the resonance frequency is different from the supply voltage frequency.

2. A method according to a claim 1, wherein the resonance circuit is provided with a capacity provided by the first inner electrode, the outer electrode and, in between, a wall part of the lamp.

3. A method according to claim 1, wherein the resonance circuit is provided with a capacitor which is connected to the first inner electrode and the outer electrode.

4. A method according to claim 1, wherein the resonance circuit is provided with a second outer electrode which is arranged near the other inner electrode near the first mentioned inner electrode, and an inductor of the resonance circuit is connected between both outer electrodes.

5. A method according to claim 1, wherein the resonance circuit is arranged to have a resonance frequency in a range from 20% of the supply voltage frequency and higher.

* * * * *